United States Patent
Todd

(10) Patent No.: US 7,873,458 B2
(45) Date of Patent: Jan. 18, 2011

(54) DEVICE FOR MEASURING INCLINE UNDER ACCELERATION

(76) Inventor: Stephen Todd, 152 Glenwood Ave., Daly City, CA (US) 94015

(*) Notice: Subject to any disclaimer, the term of this patent is extended or adjusted under 35 U.S.C. 154(b) by 741 days.

(21) Appl. No.: 11/650,110

(22) Filed: Jan. 5, 2007

(65) Prior Publication Data
US 2007/0162251 A1  Jul. 12, 2007

Related U.S. Application Data

(60) Provisional application No. 60/757,125, filed on Jan. 9, 2006.

(51) Int. Cl.
  *G06F 19/00* (2006.01)
(52) U.S. Cl. .................... 701/70; 73/504.15
(58) Field of Classification Search ............. 73/178 P, 73/504.15; 33/344; 701/76, 70
See application file for complete search history.

(56) References Cited

U.S. PATENT DOCUMENTS

| | | | |
|---|---|---|---|
| 3,651,691 A * | 3/1972 | Pliha | 73/178 R |
| 4,219,940 A | 9/1980 | Okubo | |
| 4,531,300 A | 7/1985 | Heidel et al. | |
| 5,574,650 A | 11/1996 | Diesel | |
| 7,017,701 B2 * | 3/2006 | Flynn et al. | 180/282 |
| 7,107,842 B2 * | 9/2006 | Wu et al. | 73/504.15 |
| 7,121,012 B2 | 10/2006 | Voecks | |
| 7,178,377 B2 | 2/2007 | Suzuki | |
| 2002/0002859 A1 | 1/2002 | Gesele et al. | |
| 2002/0027037 A1 | 3/2002 | Yamamoto et al. | |
| 2006/0027030 A1 * | 2/2006 | Schofl | 73/862.08 |

* cited by examiner

*Primary Examiner*—Mark Hellner
(74) *Attorney, Agent, or Firm*—Stephen Todd

(57) ABSTRACT

The device is for monitoring the pitch angle of an accelerating vehicle in substantially real time and using the data or output obtained to affect engine, braking, or suspension changes to correct or otherwise changing the vehicle's pitch angle.

14 Claims, 5 Drawing Sheets t = total tension in arm
g = force due to gravity
a = force due to vehicle acceleration $t = \sqrt{(g^2 + a^2)}$
Angle θ varies as a function of vehicle acceleration and pitch angle
Tension (t) varies as a function of vehicle acceleration

DEVICE FOR MEASURING INCLINE UNDER ACCELERATION

The present application claim priority to U.S. Provisional Application No. 60/757,125, filed on Jan. 9, 2006.

FIELD OF THE INVENTION

The device is useful in the fields of automotive and aviation control. The device is for monitoring the pitch angle of an accelerating vehicle and using the information obtained to affect engine, braking, or suspension changes to correct or modulate the vehicle's pitch angle for safety or performance benefits.

BACKGROUND

Conventional pendulum devices (e.g., tilt sensors and inclinometers) can be used to measure the pitch angle (incline, inclination) of a vehicle at rest or at constant speed. However, conventional pendulum devices do not provide a reliable measurement of a vehicle's pitch angle under conditions of hard forward acceleration or hard braking. Under such conditions, the pendulum arm will swing or deflect in response to acceleration, no longer providing a reliable measurement of the vehicle's pitch angle. For at least these reasons, a conventional pendulum device cannot be used to monitor the pitch angle of an accelerating vehicle.

One solution to this problem is to use a gyroscope to measure pitch angle changes, optionally in combination with a pendulum device or an accelerometer. The output signal from the gyroscope device is then mathematically integrated to determine the pitch angle of the vehicle, even under acceleration. These gyroscope devices are subject to drift, must often be calibrated or zeroed, are expensive to manufacture and purchase.

The present invention provides a pendulum device that monitors a vehicle's pitch angle, correcting for the inherent error of the pendulum device due to the vehicle's acceleration. This pitch data is then used to affect engine or braking adjustments to avoid catastrophic vehicle pitch angle changes.

SUMMARY OF THE INVENTION

The invention is a device for determining the pitch angle of an accelerating vehicle. The device comprises a pendulum adapted for the measurement of pendulum arm swing and pendulum arm tension. The measured pendulum arm swing and tension can be used together in a microprocessor to calculate the pitch angle of the vehicle, corrected for vehicle acceleration.

The output from the microprocessor can be used to modulate vehicle acceleration and produce a beneficial change in vehicle pitch angle. Pitch angle can be affected by modulating vehicle engine power, braking efficiency, suspension settings, or transmission. The invention is particularly useful for monitoring the pitch angle of a vehicle under conditions of hard forward acceleration (e.g. due to throttle application) or under hard braking (e.g., in the case of an emergency stop).

One embodiment of the invention is a device comprising a pendulum equipped with transducers for measuring pendulum arm deflection (or swing) and pendulum arm tension, which device then uses these measurements in a microprocessor to calculate a vehicle's pitch angle.

A particular embodiment of the invention is a pendulum device for measuring the pitch angle of an accelerating vehicle, the device comprising (i) a pendulum arm capable of swing or deflection about an axis parallel to the pitch axis of the vehicle to which the device is installed; (ii) a transducer device for measuring the swing or deflection of the arm; (iii) a transducer device for measuring tension in the arm; and (iv) a microprocessor device for calculating the vehicle pitch angle using the measurements produced by the transducers, wherein the calculated vehicle pitch is used in the microprocessor to affect changes in engine output or braking efficiency to affect a beneficial vehicle pitch angle change to reduce flipping.

Other embodiments are described in or apparent from the present description, including the drawings.

DETAILED DESCRIPTION

Overview

The invention provides a pendulum device adapted for measuring (i) swing or deflection of the pendulum arm or string and (ii) tension in the arm or string due to the inherent effect of vehicle acceleration of the suspended mass of the pendulum.

Changes in a vehicle's true pitch angle will produce a change in pendulum swing or deflection, without altering pendulum arm tension. In contrast, vehicle acceleration produces a change in swing or deflection that is accompanied by an increase in pendulum arm tension.

Figure 1:
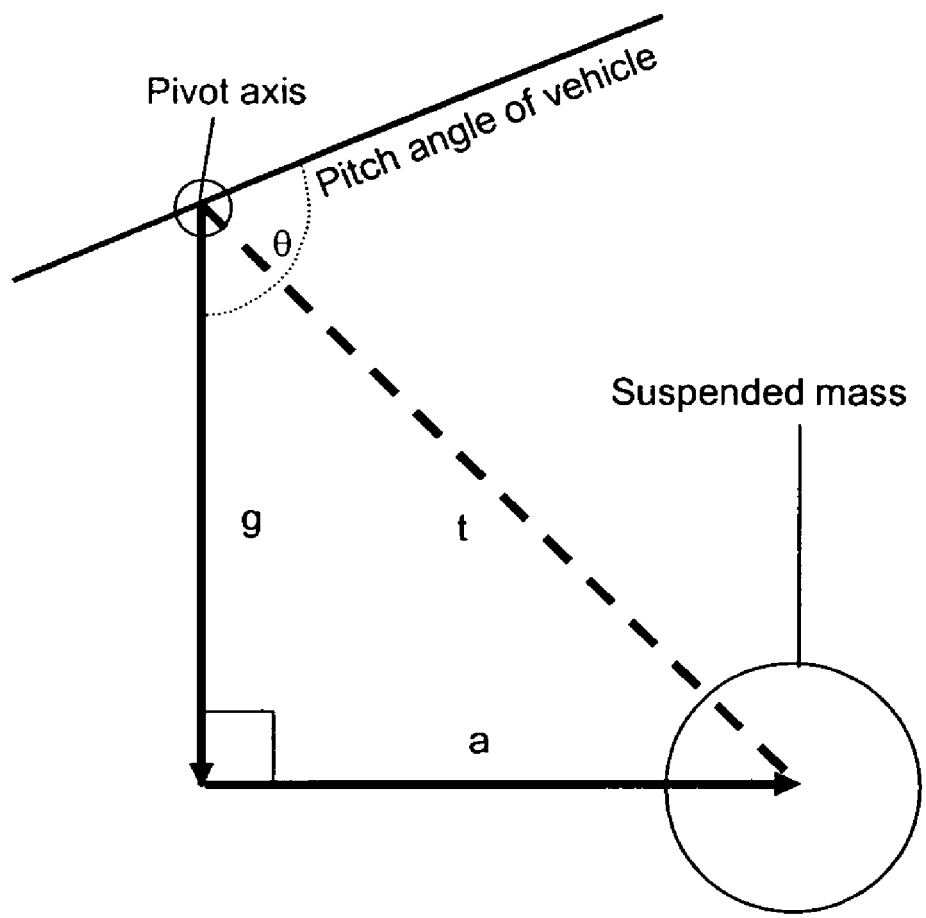
FIG. 1 depicts the geometry associated with pendulum swing or deflection due to vehicle acceleration. The pendulum is pivotally attached to a vehicle at the pivot axis, such that the pendulum responds optimally to pitch changes. Angle θ varies with vehicle acceleration and vehicle pitch angle. The tension in the pendulum arm varies only with vehicle acceleration. For convenience, pendulum arm mass will be ignored.

Since swing or deflection moves the pendulum mass away from vertical, the arm (or string) becomes the hypotenuse of a right triangle in which the suspended mass is subject to perpendicular gravity and vehicle acceleration forces, where tension in the pendulum arm must increase under positive acceleration (FIG. 1). Increase in tension as a function of vehicle acceleration can be calibrated for any pendulum system.

Using a device as exemplified herein, determining a vehicle's true pitch angle is a matter of measuring total pendulum arm swing or deflection and subtracting the amount of swing or deflection that is due to acceleration. The latter amount can be calculated from the measured increase in pendulum arm tension.

Pitch angle data produced by the device are useful for affecting vehicle engine, braking, suspension, or other adjustments to improve vehicle performance, comfort, or safety. It is of particular value for affecting throttle changes in high-powered vehicles that are prone to flip backward under hard acceleration or to affect braking changes in vehicles capable of flipping forward under hard braking.

The device has several advantages over conventional gyroscope-based orientation devices, including being less complex, less expensive to manufacture, not requiring a motor, not being subjected to drift and not requiring the integration of the device signal output.

Embodiments of the Device

In one embodiment of the invention, the device is attached to a motorcycle (or ATV) to control front wheel lift, allowing a rider to accelerate briskly, without risking flipping the motorcycle backward.

The device is mounted to the motorcycle such that the pendulum is free to swing or deflect about an axis parallel to the pitch angle axis of the vehicle. The device is used to monitor the pitch angle of a vehicle and affect a reduction in engine power output to maintain (or otherwise respond to) a pre-selected vehicle pitch angle.

Pendulum swing, deflection, and tension are measured using any number of mechanical or electrical devices, herein called transducers. Suitable damping devices are employed to provide optimal pendulum characteristics.

Modulation or control of engine power is accomplished using technology found in motorcycle and racing car "rev-limiters". Engine power may also be modulated, e.g., by changes to throttle position, fuel delivery, exhaust back-pressure, ignition timing, camshaft timing, or via other methods, including shutting off the ignition off.

In a related but different embodiment, the device is fitted to a motorcycle and used to control or modulate front wheel braking efficiency, allowing a rider to use the vehicle's efficient stopping system without risking flipping forward. Brake control is accomplished using technology available in anti-lock brakes, which (generally) involve a device for precisely controlling hydraulic fluid pressure. In this case the pendulum device is used to monitor forward pitch. The present device accurately determines the vehicle's pitch angle under braking, and the resulting data can be used to reduce braking effort by modulating hydraulic pressure (e.g., by opening a valve to release hydraulic pressure until the pitch angle return to a safe value.

In other embodiments, the device is used to adjust suspension setting, e.g., increasing damping and/or effective spring rate to accommodate the pitch angle of the vehicle. In another embodiment, the device is used to adjust the transmission, e.g., change gears or change the ratio of a constantly-variable transmission.

The device may also be used with cars, trucks, boats, ATVs, aircraft, or other vehicles that have sufficient engine and or braking power to produce large unwanted changes in pitch angle. The device may be incorporated into a vehicle at the time of manufacturer or fitting to an existing vehicle (retrofitted).

Pendulum devices have been widely used in the automotive and aviation industries. Their application ranges from automotive seat belt locking mechanisms to aircraft attitude indicators. An actual device is likely to include design features to promote compactness and accuracy. Friction and damping characteristics can be selected to avoid excessive fluctuations in measurements, while allowing the pendulum arm to react quickly to provide substantially real-time determination of vehicle pitch.

The device may comprise more than one pendulum device. Moreover, pendulum swing and tension measurements need not be obtained from the same pendulum device, so long as the relationship between acceleration and tension is known for the system in question. While the invention has mainly been described in terms of pitch determination, it can clearly be used to determine the angle about any axis (e.g., pitch, roll, and yaw), using an appropriately oriented pendulum device.

The invention is useful where it is desirable to accurately determine the attitude of an accelerating vehicle but where the vehicle's acceleration is sufficiently large as to interfere with the measurement of pitch angle that would be obtained using a conventional pendulum device. While the device has mainly been described for use on a motorcycle, the device has readily apparent applications in the aerospace industry. The data from the device (or a number of devices appropriately oriented) can be used to inform adjustments to the aircraft controls to control the aircraft's attitude and position, as with a gyroscope instrument or gyro. However, a gyro measures changes to an aircraft's attitude. The gyro signal must be integrated to determine attitude. Gyros are subject to drift, requiring frequent zeroing. The present pendulum device measures attitude directly, is not subject to drift, and does not require routing calibration.

The device may be used in conjunction with an accelerometer. Once the relationship between tension and acceleration is know for a particular pendulum device or pendulum system, the amount of swing or deflection that is due to acceleration can be calculated, even if vehicle acceleration is measured by another vehicle-mounted device, such as an accelerometer. In this embodiment of the invention, the pendulum device is calibrated with respect to acceleration error, and then a microprocessor uses acceleration measurements provided by a linked component, such as an accelerometer or a device for measuring wheel rotation, to calculate acceleration.

Various aspects of the invention are described briefly because they are not part of the invention. For example, the term transducer has been used to describe any measurement device adaptable for measuring pendulum arm swing or tension. Transducers include but are not limited to potentiometers, strain gauges, and optical devices. There are many ways to measure movement, tension, and pressure. Only a few embodiments are described and/or depicted herein.

Input from other onboard or external microprocessor devices can be combined with the device of the invention. Examples of such devices include but are not limited to accelerometers, air pressure meters, devices utilizing GPS technology, and devices for measuring wheel rotation. Input from such devices may supplement or, in one embodiment, replace data obtained from the pendulum device of the invention.

Microprocessor devices are widely used in automotive and aerospace control systems and can be adapted to suit the invention. In addition to preventing flipping and allowing a rider to maintain a preset vehicle pitch angle, the microprocessor component of the present invention can "run programs" to provide more elaborate control of engine power and/or braking. For example, a program could cause a vehicle to accelerate until a preselected pitch angle is maintained, then modulate engine or braking power as required to maintain or control the pitch angle, all with minimal rider or driver input.

Data acquisition devices, microprocessors, and engine management systems for automobiles are known in the art and currently manufactured by companies such as Yoshimura (Chino, Calif., USA), MoTeC Systems (Huntington Beach, Calif., USA), MSD Powersports (El Paso, Tex., USA), Life Racing (Basildon, Essex, UK), Van Kronenburg (Geldrop, The Nederlands), DTA (Salford, England, UK), Omex (Gloucestershire, England, UK), AiM Sports (Lake Elsinore, Calif., USA), and Summit Racing (Akron, Ohio, USA).

Engine management systems typically include an engine revolution (rpm) limiting feature (i.e., a rev-limiter). Rev-limiters may be "soft-limiters" in that they reduce engine power in a controlled manner, avoiding the abrupt loss of engine power. Rev-limiter technology may be adapted to limit the rpm or power output of an engine for reducing the pitch angle of an accelerating vehicle, the pitch angle being determined by the present device. For example, on a motorcycle or car, the rev-limiter or related device may selectively or randomly cut the ignition or retard the ignition timing for one or more cylinders of the engine.

Pendulum devices are known in the art and include tilt sensors and inclinometers, which generate an artificial horizon and measure angular tilt with respect to this horizon. Tilt sensors are used in cameras, aircraft flight controls, automobile security systems, and special switches. Tilt sensors and inclinometers vary in their tilt angle range and number of axes. The tilt angle range is the range of desired output. Tilt sensors and inclinometers can be many different types of devices including sensor element or chip, sensor or transducer, instrument or meter, gauge or indicator, and recorder and totalizers.

Inclinometers and gyroscope compensated orientation sensors are manufactured by companies such as Control Transducers, Ltd. (Bedford, England, UK), Advanced Orientatioin Systems, Inc. (Linden, N.J., USA), Positek Limited (Cheltenham, Glos, UK), Crossbow Technology, Inc. (San Jose, Calif., USA), Spectron Glass and Electronics Incorporated (Hauppauge, N.Y., USA), SignalQuest, Inc. (Lebanon, N.H., USA), US Digital (Vancouver, Wash., USA), Rieker (Folcroft, Pa., USA), and MicroStrain, Inc. (Williston, Vt., USA).

Current tilt sensor and inclinometer technologies include accelerometer, capacitive, electrolytic, gas bubble in liquid, mercury, and pendulum devices. Accelerometers are instruments for measuring, displaying, and analyzing acceleration and vibration. Capacitive tilt sensors are designed primarily to take noncontact measurements of tilt and inclination. Electrolytic tilt sensors are capable of producing extremely accurate pitch and roll measurements in a variety of applications. A gas bubble in liquid is comprised of a sight glass filled with liquid. A mercury type tilt sensor consists of a small metal or glass can, inside of which are two electrodes and a minute drop of mercury. Operation is then based on the tilted position of the sensor: Towards the electrodes closes the circuit, away from the electrodes opens the circuit. A pendulum type sensor is a pendulum or weight in conjunction with a rotary sensor.

Common electrical outputs for inclinometers and tilt sensors include analog current, digital (TTL), analog frequency or pulse, analog voltage, serial, parallel, and switched or alarm. Display types are typically analog meters, digital numerical displays, or video displays depending on the requirements of the user and application.

Additional embodiments of the invention will be apparent given the present description. The description and examples described herein are not intended to limit the scope of the invention.

EXAMPLES

Example 1

Motorcycle Engine Power Control Device for a Sport Bike

Some motorcycles, ATVs, dragsters, and other more specialized vehicles produce sufficient rear wheel torque to significantly alter the pitch of the vehicle, even to the point of flipping the vehicle backward. Some vehicles, particularly motorcycles and ATVs, also have sufficient front wheel braking power to flip a vehicle forward.

The pendulum device is generally contained in a casing that can be mounted to a motorcycle (or ATV). The device has a remote, handle bar-mounted user interface for selecting features. The device provides electrical connectors for functionally connecting the device to the existing wiring harness or electrical components of the vehicle. The device may be vehicle and/or manufacturer-specific or programmable for any vehicle. This example is an aftermarket add-on for sport-bikes based on their brand.

The pendulum device includes a hinged arm that swings on a sealed ball bearing. A first potentiometer is attached to the swing arm pivot axis where resistance changes as the arm swings in response to changes in vehicle pitch angle and acceleration. In this example, the bearing provides sufficient damping to avoid use of a separate damper mechanism.

Figure 2:
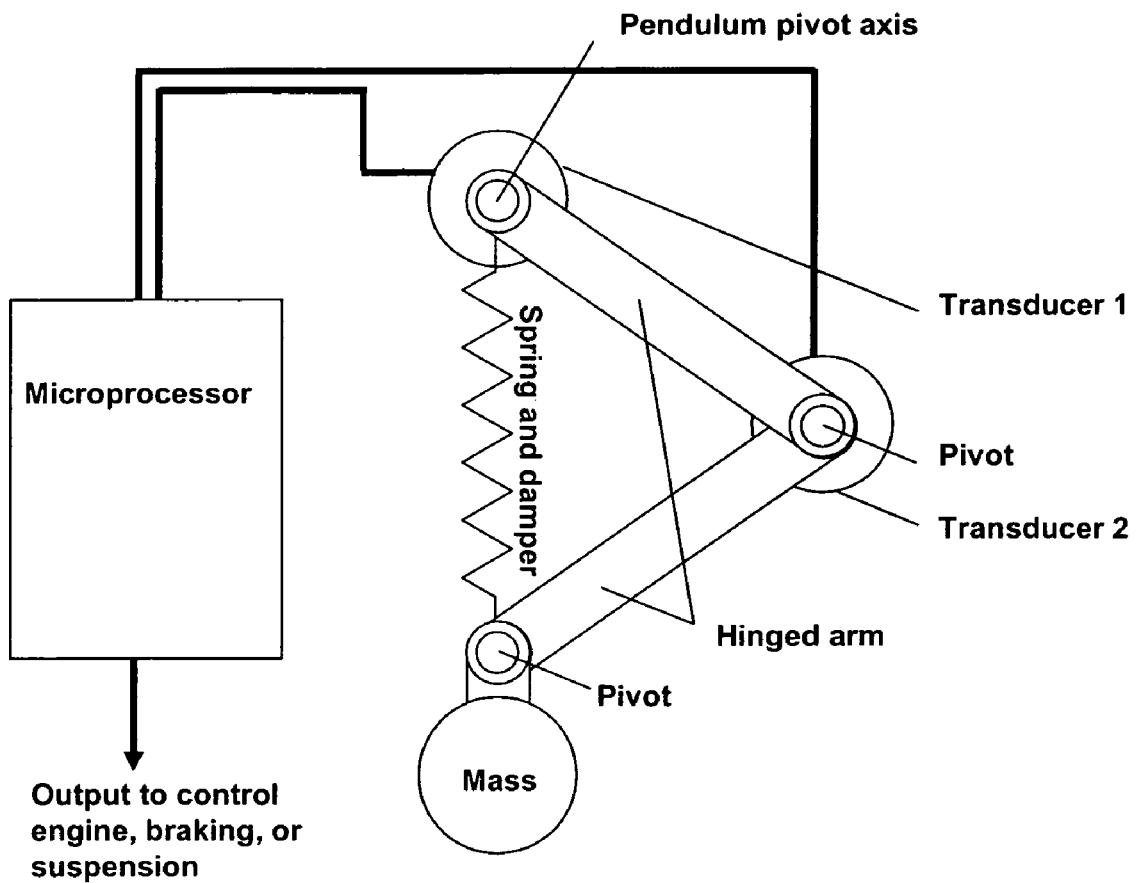
FIG. 2 depicts an embodiment of the invention utilizing two rotary-style potentiometer-based transducers to measure pendulum arm swing (Transducer 1) and pendulum arm tension. Tension can be calculated from the increase in length of the hinged pendulum arm, which produces rotation at the indicated pivot where Transducer 2 is positioned. The spring rate and damping characteristics are selected for the particular pendulum device used in the device. The microprocessor produces a pitch output that can be used to control the vehicles engine, brake system, or suspension to affect beneficial pitch changes.
Figure 3:
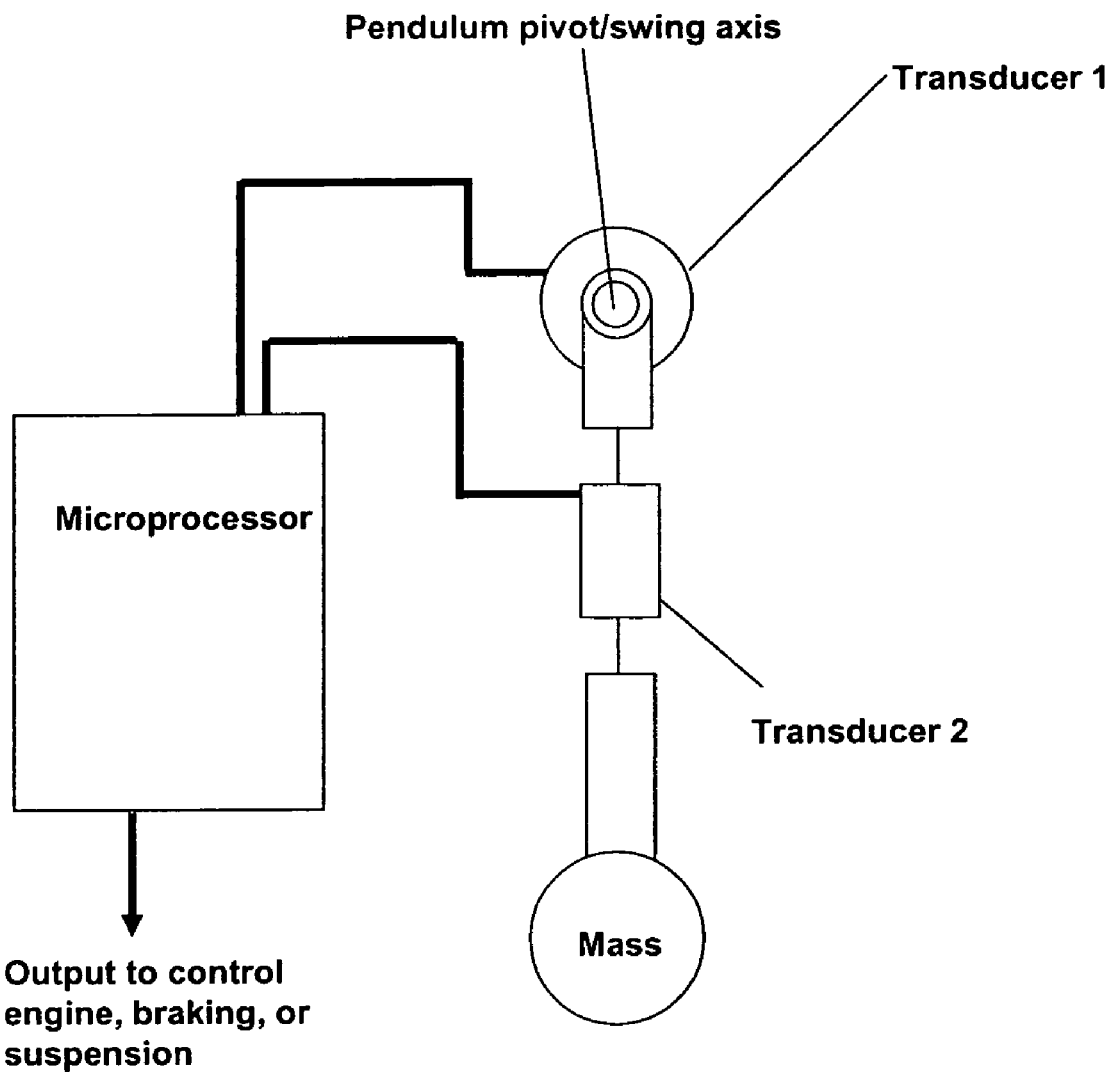
FIG. 3 depicts an embodiment of the invention wherein Transducer 2 is a tension-measuring transducer (i.e., a strain gauge).
Figure 4:
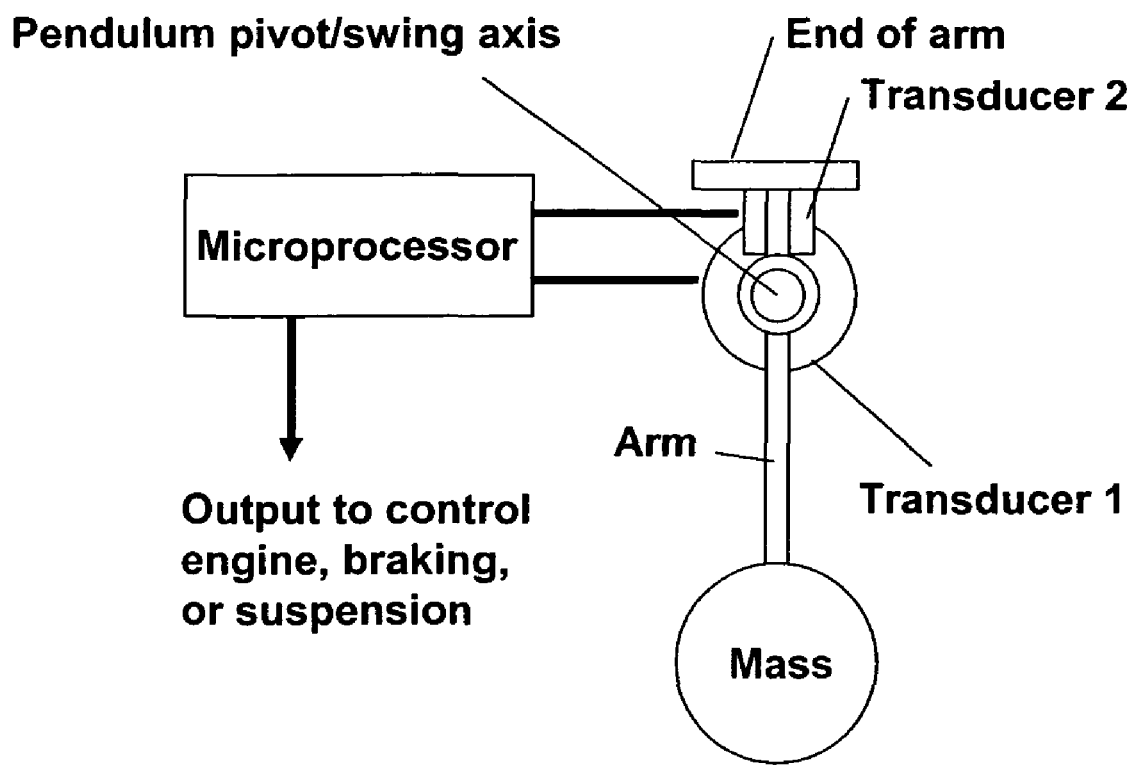
FIG. 4 depicts an embodiment of the invention wherein Transducer 2 is a pressure-measuring transducer located between the pendulum pivot and the end of the pendulum arm. In this arrangement, the pendulum arm slides through the pivot axis.
Figure 5:
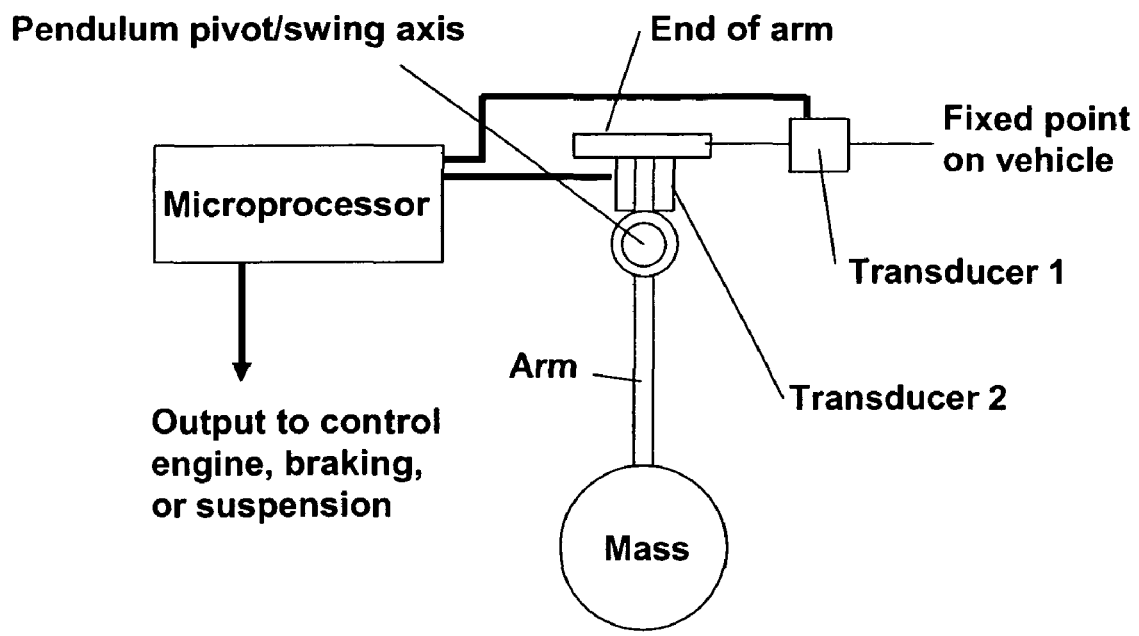
FIG. 5 depicts an embodiment of the invention wherein Transducer 1 is a strain gauge and Transducer 2 is a pressure measuring transducer.

Swing arm tension is measured using a second potentiometer located in the hinge incorporated into the pendulum arm, as in FIG. 2. Resistance changes under vehicle acceleration when tension in the arm increases, producing rotation at the hinge pivot.

Data from the potentiometers are provided to a microprocessor device, which calculates the pitch of the motorcycle, corrected for forward acceleration. The microprocessor modulates the power output of the engine to maintain a preset pitch angle. In this case, the rev-limiter is activated just long enough to affect pitch correction. The microprocessor includes a user interface allowing the user/rider to set a pitch angle that causes the microprocessor to trigger the rev-limiter.

Example 2

Motorcycle Braking Safety Device for a Sport Bike

Some vehicles, particularly motorcycles and ATVs, also have sufficient front wheel braking power to flip a vehicle forward. The device is similar to that described in Example 1. The device provides connectors for functionally connecting the device to the vehicle's wiring harness, to other vehicle systems, and/or to additional electrical/hydraulic devices for modulating fluid pressure in the motorcycle's front brake system.

Data from the transducers are provided to a microprocessor device and the pitch angle of the motorcycle is used to control the effectiveness of the motorcycle's front brake system by reducing the fluid pressure in the front brake line, using a microprocessor-controlled solenoid valve plumbed between the front brake master cylinder and the front brake calipers. The valve releases hydraulic brake pressure (in a controlled manner) when the motorcycle attains a preset pitch angle, reducing the likelihood of a forward flip. The device is readily combined with anti-lock brakes, if the vehicle is so-equipped.

As the pitch angle obtains a predetermined amount (set in the microprocessor by the manufacturer or rider), the front brake effectiveness is varied to maintain a preset pitch angle or affect a change in pitch angle.

What is claimed is:

1. A pendulum device for determining the pitch angle of an accelerating vehicle, the device comprising a pendulum adapted for the independent measurement of pendulum arm swing and pendulum arm tension, wherein the measured pendulum arm swing and tension are used in a microprocessor to produce an output determination of the pitch angle of an accelerating vehicle.

2. The device of claim 1, wherein the output is used to modulate the acceleration of the vehicle to produce a beneficial change in vehicle pitch angle.

3. The device of claim 2, wherein the beneficial change is affected by modulating vehicle engine power.

4. The device of claim 2, wherein the beneficial change is affected by modulating vehicle braking.

5. The device of claim 2, wherein the output is used to modulating vehicle suspension settings.

6. A pendulum device for measuring vehicle pitch angle, independent of vehicle acceleration, the device comprising a pendulum having transducers for independently measuring pendulum arm deflection and pendulum arm tension, wherein measured pendulum arm deflection and tension are used in a microprocessor to calculate vehicle pitch angle.

7. A safety system for reducing motorcycle and ATV flipping, the system providing a pendulum device for measuring the pitch angle of an accelerating motorcycle, the device comprising:

a pendulum arm capable of swing or deflection about an axis parallel to the pitch angle axis of the vehicle;

a first transducer device for measuring the swing or deflection of the arm;

a second transducer device for measuring the tension in the arm; and a microprocessor device for calculating the vehicle pitch angle of the vehicle using the measurements produced by the first and second transducers, wherein the calculated vehicle pitch is used in the microprocessor to affect changes in engine output or braking efficiency to affect a beneficial vehicle pitch angle change to reduce flipping.

8. The device of claim 6, wherein the pendulum arm is hinged and tension is measured by measuring an increase in length of the hinged pendulum arm.

9. The device of claim 6, wherein tension is measured using a strain gauge.

10. The device of claim 6, wherein tension is measured using a pressure gauge.

11. The device of claim 7, wherein the pendulum arm is hinged.

12. The device of claim 11, wherein tension is measured by measuring an increase in length of the hinged pendulum arm.

13. The device of claim 7, wherein the second transducer is a strain gauge.

14. The device of claim 7, wherein the second transducer is a pressure measuring transducer.

* * * * *